United States Patent
Chan et al.

(10) Patent No.: US 10,894,522 B2
(45) Date of Patent: Jan. 19, 2021

(54) MAGNETIC COLLISION DAMPING DEVICE FOR VEHICLES

(71) Applicant: King Chan, Kowloon (HK)

(72) Inventors: King Chan, Kowloon (HK); Chen Yuet Chan, Kowloon (HK)

(73) Assignee: Chan King, Kowloon (HK)

( * ) Notice: Subject to any disclaimer, the term of this patent is extended or adjusted under 35 U.S.C. 154(b) by 50 days.

(21) Appl. No.: 16/426,938

(22) Filed: May 30, 2019

(65) Prior Publication Data

US 2019/0366961 A1   Dec. 5, 2019

(30) Foreign Application Priority Data

Jun. 5, 2018   (CN) .......................... 2018 1 0566259

(51) Int. Cl.
*B60R 19/26* (2006.01)
*B60R 19/24* (2006.01)
*B60R 19/36* (2006.01)

(52) U.S. Cl.
CPC .............. *B60R 19/26* (2013.01); *B60R 19/24* (2013.01); *B60R 19/36* (2013.01)

(58) Field of Classification Search
CPC ....... B60R 19/02; B60R 19/023; B60R 19/18; B60R 19/24; B60R 19/26; B60R 19/36
USPC ........................................ 296/120, 132, 135
See application file for complete search history.

(56) References Cited

U.S. PATENT DOCUMENTS

| | | | | |
|---|---|---|---|---|
| 3,831,847 A * | 8/1974 | Serritella | ................ | B60R 19/02 293/102 |
| 5,370,430 A * | 12/1994 | Mozafari | ................ | B60R 19/26 293/120 |
| 5,593,195 A * | 1/1997 | Lei | .......................... | B60R 19/02 293/134 |
| 5,971,451 A * | 10/1999 | Huang | .................... | B60R 19/18 293/102 |
| 6,709,035 B1 * | 3/2004 | Namuduri | ............... | B60R 19/40 293/118 |
| 8,016,332 B1 * | 9/2011 | Shoap | ..................... | B60R 19/30 293/132 |
| 2015/0001862 A1 * | 1/2015 | Son | ......................... | B60R 19/04 293/120 |

FOREIGN PATENT DOCUMENTS

JP   2009137489 A  *  6/2009

* cited by examiner

*Primary Examiner* — Jason S Daniels
(74) *Attorney, Agent, or Firm* — Nyemaster Goode P.C.

(57) ABSTRACT

A magnetic collision damping device for vehicles is disclosed, in one embodiment of which a first trough 3 and a second trough 4 are slidably connected to a vehicle frame, and electromagnets 7, 8 whose like poles are arranged to face each other are fixed inside the first trough 3 and the second trough 4. This invention can prevent the electromagnets from being damaged when being subject to an impact, and can demonstrate its collision damping function regardless of whether a collision force comes from a vehicle front or a vehicle rear. All electromagnets are arranged close to the vehicle rear, effectively protecting the safety of passengers.

10 Claims, 3 Drawing Sheets

MAGNETIC COLLISION DAMPING DEVICE FOR VEHICLES

FIELD OF THE INVENTION

This invention relates to vehicles, particularly to a collision damping device for vehicles that uses a magnetic force to reduce collision damage to a vehicle.

BACKGROUND OF THE INVENTION

A "magnetic collision damping device for vehicles" known in the prior art comprises electromagnets fixed onto the vehicle front bumper, and the electromagnets are easily damaged as the bumper is subject to an impact and deformed, leading to the failure of the device. In addition, when the collision force comes from the rear of a vehicle, the device can be of no effect. Moreover, all parts and components of the device are arranged nearby the front of the vehicle, therefore only the front of the vehicle is within the effective area of absorbing the collision force by the device, which may not provide ideal protection for passengers.

SUMMARY OF THE INVENTION

An object of this invention is to overcome the above technical shortcomings by providing a magnetic collision damping device.

This invention has two technical solutions. The first solution is implemented by providing a magnetic collision damping device for vehicles comprising a vehicle front bumper and a vehicle rear bumper, wherein a first trough and a second trough that are slidably connected to a vehicle frame and mounted at a position near a rear part of a vehicle body, the first trough and the second trough being separated for at a certain distance, and a first stopper and a second stopper fixed onto the vehicle frame, the first stopper preventing the first trough from sliding in a direction toward a vehicle front so that the first trough bed is only able to slide in a direction toward a vehicle rear direction, the second stopper preventing the second trough from sliding in the direction toward the vehicle rear so that the second trough bed is only able to slide in the direction toward the vehicle front;

at least one electromagnet fixed inside each of the first trough and the second trough, like poles of the electromagnets inside the first trough and the second trough being arranged to face each other;

a first mandrel fixed to the vehicle front bumper and configured to be slidably connected to the vehicle frame and extend to the first trough, wherein when the vehicle front bumper is subject to an impact from the front of the vehicle front, the electromagnet inside the first trough is caused to move closer to the electromagnet inside the second trough so as to generate a repulsion force therebetween by virtue of the first mandrel pressing against the first trough to drive the first trough to move toward the second trough;

a second mandrel fixed to the vehicle rear bumper and configured to be slidably connected to the vehicle frame and extend to the second trough, wherein when the vehicle rear bumper is subject to an impact from the rear of the vehicle rear, the electromagnet inside the second trough is caused to move closer to the electromagnet inside the first trough so as to generate a repulsion force therebetween by virtue of the second mandrel pressing against the second trough to drive the second trough to move toward the first trough;

a first buffer return spring connecting the vehicle front bumper and the vehicle frame, and a second buffer return spring connecting the vehicle rear bumper and the vehicle frame.

As a preferred but alternative embodiment of the first solution, a power switch in conjunction with the first trough or a power switch in conjunction with the second trough is provided, the power switch being connected in series in current circuits of all electromagnets and turned on only when the movement of the first trough or the second trough occurs.

The second solution of this invention is implemented by providing a magnetic collision damping device for vehicles comprising a vehicle front bumper and a vehicle rear bumper, wherein a first trough and a second trough that are slidably connected to a vehicle frame and mounted at a position near a rear part of a vehicle body, a third trough arranged between the first trough and the second trough and fixed onto the vehicle frame, the first trough and the third trough being separated at a certain distance, the second trough and the third trough being separated at a certain distance, and a first stopper and a second stopper fixed onto the vehicle frame, the first stopper preventing the first trough from sliding in a direction toward a vehicle front so that the first trough is only able to slide in a direction toward a vehicle rear, the second stopper preventing the second trough from sliding in the direction toward the vehicle rear so that the second trough is only able to slide in the direction toward the vehicle front;

at least one electromagnet fixed inside each of the first trough, the second trough and the third trough, like poles of the electromagnets inside the first trough and the third trough being arranged to face each other, like poles of the electromagnets inside the second trough and the second trough being arranged to face each other;

a first mandrel fixed to the vehicle front bumper and configured to be slidably connected to the vehicle frame and extend to the first trough, wherein when the vehicle front bumper is subject to an impact from the front of the vehicle front, the electromagnet inside the first trough is caused to move closer to the electromagnet inside the third trough so as to generate a repulsion force therebetween by virtue of the first mandrel pressing against the first trough to drive the first trough to move toward the third trough;

a second mandrel fixed to the vehicle rear bumper and configured to be slidably connected to the vehicle frame and extend to the second trough, wherein when the vehicle rear bumper is subject to an impact from the rear of the vehicle rear, the electromagnet inside the second trough is caused to move closer to the electromagnet inside the third trough so as to generate a repulsion force therebetween by virtue of the second mandrel pressing against the second trough to drive the second trough to move toward the third trough;

a linkage mechanism provided between the first trough and the second trough in a manner that the movement of the first trough toward the second trough triggers the linkage mechanism to drive the second trough to move toward the first trough, and the movement of the second trough toward the first trough triggers the linkage mechanism to drive the first trough to move toward second trough;

a first buffer return spring connecting the vehicle front bumper and the vehicle frame, and a second buffer return spring connecting the vehicle rear bumper and the vehicle frame.

As a preferred but alternative embodiment of the second solution, the linkage mechanism comprises a link fixedly connected to the first trough and a lever rotatably connected to the vehicle frame, one end of the lever being articulated with the link, and another end of the lever being articulated with the second trough; the movement of the first trough toward the second trough causes the link to rotate the lever which in turn drives the second trough to move toward the first trough.

As a preferred but not alternative embodiment of the second solution, the linkage mechanism comprises a link fixedly connected to the second trough and a lever rotatably connected to the vehicle frame, one end of the lever being articulated with the link, and another end of the lever being articulated with the first trough; the movement of the first trough toward the second trough causes rotation of the lever which in turn drives the link to pull the second trough to move toward the first trough.

As a preferred but alternative embodiment of the second solution, a third buffer return spring is provided to connect the first trough and the third trough, and a fourth buffer return spring is provided to connect the second trough and the third trough.

As a preferred but alternative embodiment of the second solution, a power switch in conjunction with the first trough or a power switch in conjunction with the second trough is provided, the power switch being connected in series in current circuits of all electromagnets and turned on only when the movement of the first trough or the second trough occurs.

The advantages of this invention are: 1. all electromagnets are not provided on or in the vehicle front bumper and the vehicle rear bumper, preventing the electromagnets from being damaged as the bumper(s) is/are subject to an impact and deformed, effectively protecting the electromagnets and extending service life of the electromagnets; 2. regardless of the collision force coming from the vehicle front or the vehicle rear, the collision damping device can function and thus enhance the protection function of the device; 3. all the electromagnets are situated at a position near the rear part of a vehicle body, wherein due to the relatively wider space of the rear part, the collision energy upon the impact would be guided to the rear part, which can protect safety of passengers in the vehicle and reduce damage to the vehicle body more effectively.

DETAILED DESCRIPTION OF THE INVENTION

For ease of understanding of the invention, this invention will be more comprehensively described below with reference to the appended drawings. The drawings provide preferred embodiments of this invention. However, the invention can be realized in many different forms, and is not limited to the embodiments described herein. The purpose of providing these embodiments is to facilitate thorough understanding of the disclosed subject matter of this invention.

It should be appreciated that the terms "first", "second", "third", "fourth" in this invention do not represent any actual quantity or sequence, but are rather only used to distinguish one element from another.

Embodiment 1

Figure 1:
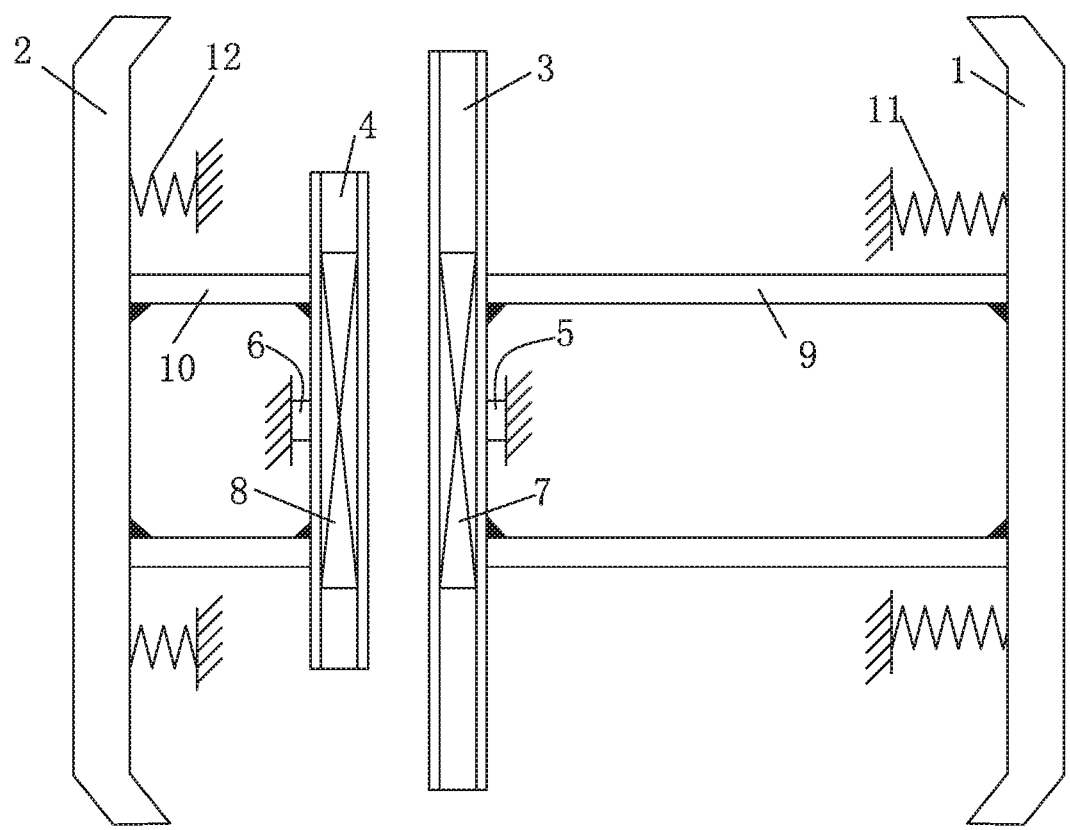
FIG. 1 is a schematic structural diagram showing an embodiment of the first solution of the invention.

Referring to FIG. 1, there is illustrated an embodiment of the first solution of the invention. The magnetic collision damping device for vehicles comprises a vehicle front bumper 1 and a vehicle rear bumper 2. A first trough 3 and a second trough 4 that are slidably connected to a vehicle frame are mounted at a position near a rear part of a vehicle body. The first trough 3 and the second trough 4 can be made of channel steel. The first trough 3 and the second trough 4 are separated at a certain distance. A first stopper 5 preventing the first trough 3 from sliding in a direction toward a vehicle front is fixed onto the vehicle frame so that the first trough 3 is only able to slide in a direction toward a vehicle rear. A second stopper 6 preventing the second trough 4 from sliding in the direction toward the vehicle rear is fixed onto the vehicle frame so that the second trough 4 is only able to slide in the direction toward the vehicle front. Electromagnets 7, 8 are fixed inside the first trough 3 and the second trough 4 respectively, and like poles of the electromagnets 7, 8 are arranged to face each other. The electromagnet mounted inside the same trough can comprise a single electromagnet or a plurality of electromagnets.

A first mandrel 9 is fixed to the vehicle front bumper 1. The first mandrel 9 is slidably connected to the vehicle frame and extends to the first trough 3. The vehicle front bumper 1 can slide together with the first mandrel 9. The first mandrel 9 is fixedly connected with the first trough 3. When the vehicle front bumper 1 is subject to an impact from the front of the vehicle front, the electromagnet 7 inside the first trough 3 is caused to move closer to the electromagnet 8 inside the second trough 4 so as to generate a repulsion force therebetween by virtue of the first mandrel 9 pressing against the first trough 3 to drive the first trough 3 to move toward the second trough 4. This repulsion force, quickly intensifying as the electromagnets 7, 8 are moving closer to each other, is a type of stronger soft elasticity, effectively absorbing energy generated by the impact on the vehicle front to serve to protect safety of passengers in the vehicle and reduce damage to the vehicle.

A second mandrel 10 is fixed to the vehicle rear bumper 2. The second mandrel 10 is slidably connected to the vehicle frame and extends to the second trough 4. The vehicle rear bumper 2 can slide together with the second mandrel 10. The second mandrel 9 is fixedly connected with the second trough 4. When the vehicle rear bumper 2 is subject to an impact from the rear of the vehicle rear, the electromagnet 8 inside the second trough 4 is caused to move closer to the electromagnet 7 inside the first trough 3 so as to generate a repulsion force therebetween by virtue of the second mandrel 10 pressing against the second trough 4 to drive the second trough 4 to move toward the first trough 3. This repulsion force, quickly intensifying as the electromagnets 7, 8 are moving closer to each other, is a type of stronger soft elasticity, effectively absorbing energy generated by impact on the vehicle front to serve to protect safety of passengers in the vehicle and reduce damage to the vehicle.

A first buffer return spring 11 is provided to connect the vehicle front bumper 1 and the vehicle frame, and a second buffer return 12 spring is provided to connect the vehicle rear bumper 2 and the vehicle frame. The first buffer return spring 11 and the second buffer return 12 not only enhance the effect of buffering and collision damping, but also serve to assist the vehicle front bumper 1 and the vehicle rear bumper 2 to return to their original positions.

Embodiment 2

Figure 2:
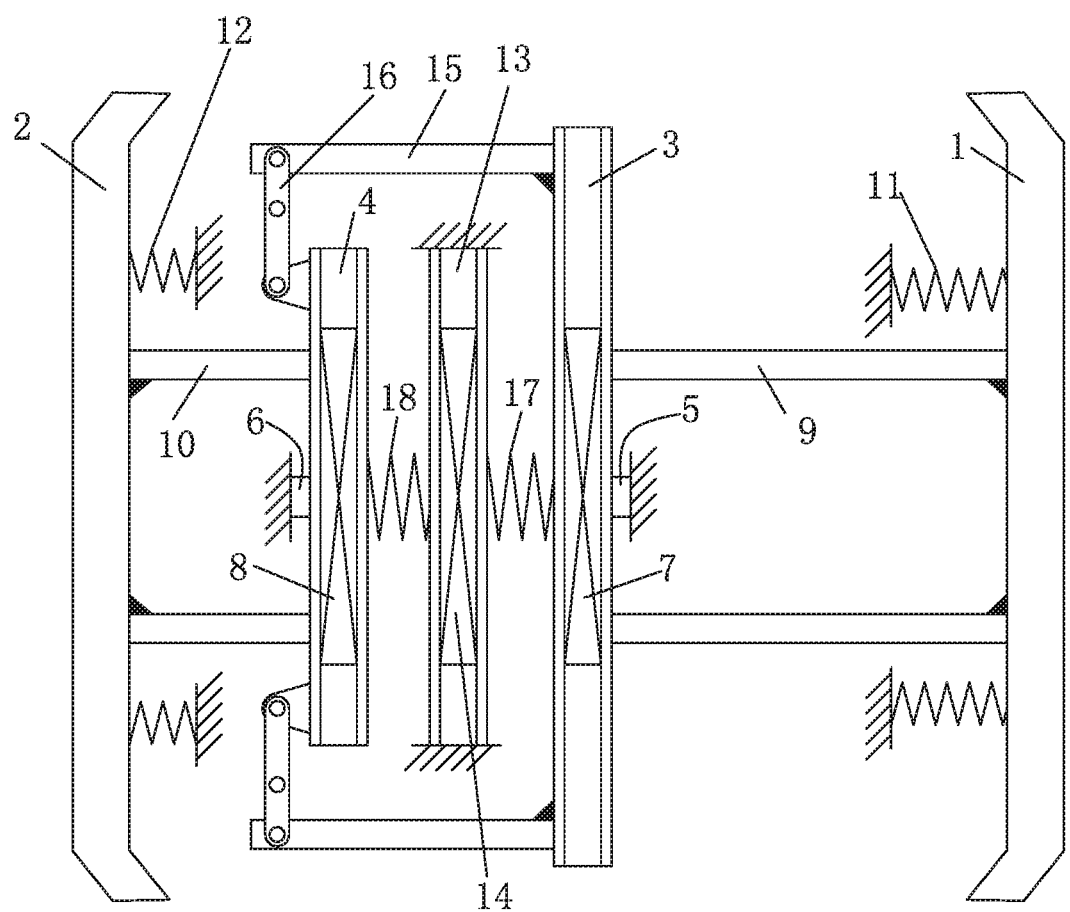
FIG. 2 is a schematic structural diagram showing an embodiment of the second solution of the invention.

Referring to FIG. 2, there is illustrated an embodiment of the second solution of the invention. This embodiment is a variation of Embodiment 1 and additionally comprises a third trough 13 between the first trough 3 and the second trough 4. The third trough 13 is fixed onto the vehicle frame. The first trough 3 and the third trough 13 are arranged in spaced-apart fashion; the second trough 4 and the third trough 13 are arranged in spaced-apart fashion. An electromagnet 14 is fixed inside the third trough 13. Like poles of the electromagnet 7 in the first trough 3 and the electromagnet 14 in the third trough 13 are arranged to face each other; like poles of the electromagnet 8 in the second trough 4 and the electromagnet 14 in the third trough 13 are arranged to face each other. In this embodiment, the first mandrel 9 and the first trough 3 come into contact with each other, instead of being connected together. The second mandrel 10 and the second trough 4 also come into contact with each other, instead of being connected together.

When the first trough 3 is pressed by the first mandrel 9 to move toward the second trough 4, the electromagnet 7 inside the first trough 3 moves closer enough to the electromagnet 14 in the third trough 13 to generate a repulsion force. This repulsion force, quickly intensifying as the electromagnets 7, 14 are moving closer to each other, is a type of stronger soft elasticity, effectively absorbing energy generated by the impact on the vehicle front to serve to protect safety of passengers in the vehicle and reduce damage to the vehicle. When the second trough 4 is pressed by the second mandrel 10 to move toward the first trough 3, the electromagnet 8 inside the second trough 4 moves closer enough to the electromagnet 14 in the third trough 13 to generate a repulsion force. This repulsion force, quickly intensifying as the electromagnets 8, 14 are moving closer to each other, is a type of stronger soft elasticity, effectively absorbing energy generated by impact on the vehicle front to serve to protect safety of passengers in the vehicle and reduce damage to the vehicle.

A linkage mechanism is also provided between the first trough 3 and the second trough 4. The linkage mechanism comprises a link 15 fixedly connected to the first trough 3 and a lever 16 rotatably connected to the vehicle frame. A rotation shaft of the lever 16 is fixed onto the vehicle frame. One end of the lever 16 is articulated with the link 15, and another end of the lever 16 with the second trough 4. When the first trough 3 is caused to move toward the second trough 4 as the vehicle front bumper 1 is subject to an impact, the link 15 drives the lever 16 to rotate and the lever 16 toggles the second trough 4 to move toward the first trough 3, so that the first trough 3 and the second trough 4 are able to move toward the third trough 13 simultaneously. Likewise, when the second trough 4 is caused to move toward the first trough 3 as the vehicle rear bumper 2 is subject to an impact, the second trough 4 drives the lever 16 to rotate and the lever 16 drives the link 15 to pull the first trough 3 to move toward the second trough 4, so that the first trough 3 and the second trough 4 are able to move toward the third trough 13 simultaneously. The feature of the first trough 3 and the second trough 4 being able to move toward the third trough 13 simultaneously enhances the total repulsion force of the electromagnets, thereby to absorb a bigger vehicle collision force.

A third buffer return spring 17 is provided to connect the first trough 3 and the third trough 13, and a fourth buffer return spring 18 is provided to connect the second trough 4 and the third trough 13. The third buffer return spring 17 and the fourth buffer return 18 not only enhance the effect of buffering and collision damping, but also serve to assist the first trough 3 and the second trough 4 to return to their original positions.

The structure and operation principle not described in this embodiment may be made reference to Embodiment 1 discussed above.

Embodiment 3

Figure 3:
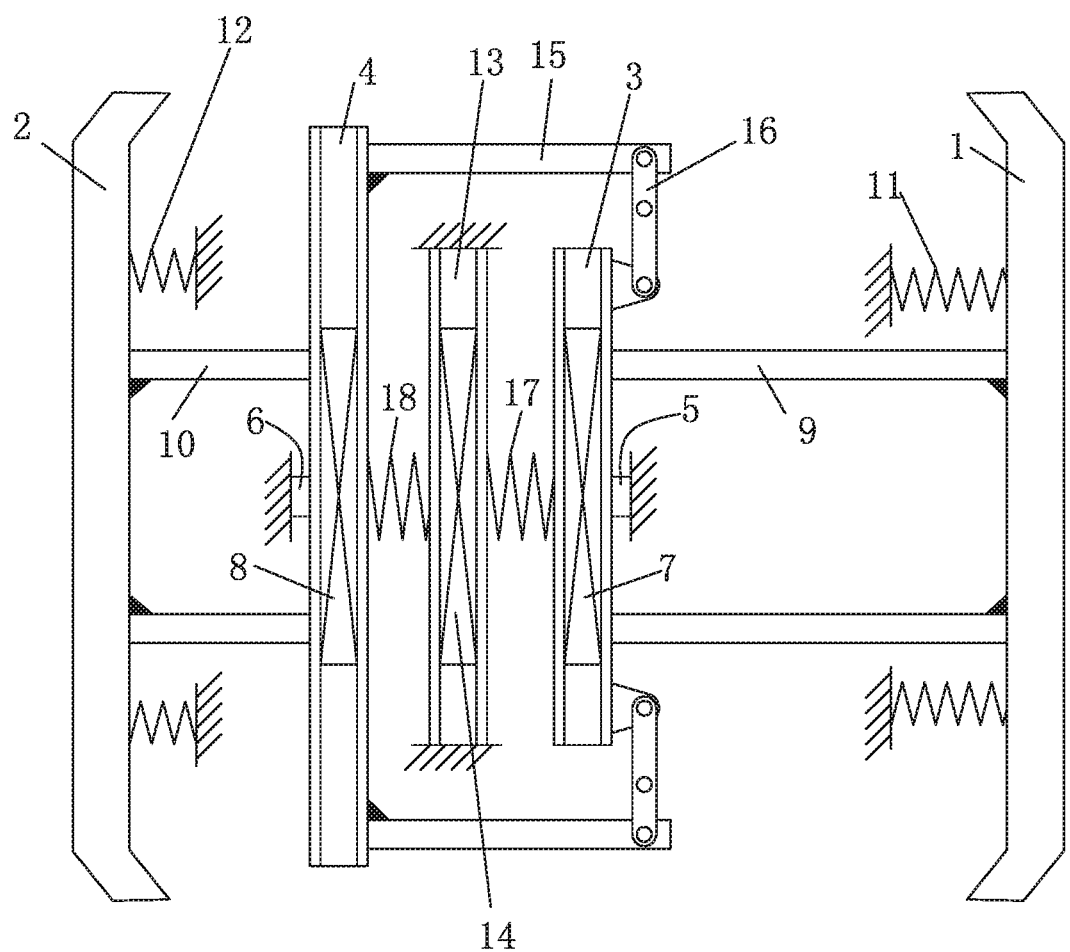
FIG. 3 is schematic structural diagram showing another embodiment of the second solution of the invention.

Referring to FIG. 3, the embodiment illustrated in this figure is substantially the same as Embodiment 2, but differs in that the link 15 of the linkage mechanism is fixed onto the second trough 4, one end of the lever 16 is articulated with the link 15 and another end of the lever 16 with the first trough 4. When the first trough 3 is caused to move toward the second trough 4 as the vehicle front bumper 1 is subject to an impact, the first trough 3 drives the lever 16 to rotate and the lever 16 drives the link 15 to pull the second trough to move toward the first trough 3, so that the first trough 3 and the second trough 4 are able to move toward the third trough 13 simultaneously. Likewise, when the second trough 4 is caused to move toward the first trough 3 as the vehicle rear bumper 2 is subject to an impact, the link 15 drives the lever 16 to rotate and the lever 16 toggles the first trough 3 to move toward the second trough 4, so that the first trough 3 and the second trough 4 are able to move toward the third trough 13 simultaneously.

The structure and operation principle not described in this embodiment may be made reference to Embodiments 1 and 2 discussed above.

In the most preferred embodiment, each electromagnet of this invention does not need to be electrified all the time. In this invention, a power switch in conjunction with the first trough 3 or a power switch in conjunction with the second trough 4 can be provided, while the power switch may be being connected in series in current circuits of all electromagnets. Only when the movement of the first trough 3 or the second trough 4 occurs is the power switch turned on to electrify the respective electromagnets. Moreover, a timer can also be provided in the control circuit of the electromagnets to automatically turn off the power switch after it has been turned on for a predetermined period of time, e.g. to turn off the power switch two seconds after an impact. No magnetic force is generated between the electromagnets after the power is cut off, the collision energy absorbed will also be released at the same time as the magnetic force disappears, i.e. the collision energy dissipates as the magnetic force disappears. When an impactor is removed, the troughs, the bumpers, etc. automatically return to their original positions under the action of the return springs.

The embodiments mentioned above only represent several embodiments of this invention, which have been described in a more specific and detailed way, but cannot be construed as limitations to the scope of this invention. On the premise of not departing from the spirit of this invention, those skilled in the art can further make several variations and improvements, which all fall within the protection scope of this invention. The protection scope of this invention should be determined by the appended claims.

What is claimed is:

1. A magnetic collision damping device for vehicles, comprising a vehicle front bumper and a vehicle rear bumper, characterized by comprising:
   a first trough and a second trough that are slidably connected to a vehicle frame and mounted at a position near a rear part of a vehicle body, the first trough and the second trough being separated at a certain distance, and a first stopper and a second stopper fixed onto the vehicle frame, the first stopper preventing the first trough from sliding in a direction toward a vehicle front so that the first trough is only able to slide in a direction toward a vehicle rear, the second stopper preventing the second trough from sliding in the direction toward the vehicle rear so that the second trough is only able to slide in the direction toward the vehicle front;
   at least one electromagnet fixed inside each of the first trough and the second trough, like poles of the electromagnets inside the first trough and the second trough being arranged to face each other;
   a first mandrel fixed to the vehicle front bumper and configured to be slidably connected to the vehicle frame and extend to the first trough, wherein when the vehicle front bumper is subject to an impact from the front of the vehicle front, the electromagnet inside the first trough is caused to move closer to the electromagnet inside the second trough so as to generate a repulsion force therebetween by virtue of the first mandrel pressing against the first trough to drive the first trough to move toward the second trough;
   a second mandrel fixed to the vehicle rear bumper and configured to be slidably connected to the vehicle frame and extend to the second trough, wherein when the vehicle rear bumper is subject to an impact from the rear of the vehicle rear, the electromagnet inside the second trough is caused to move closer to the electromagnet inside the first trough so as to generate a repulsion force therebetween by virtue of the second mandrel pressing against the second trough to drive the second trough to move toward the first trough;
   a first buffer return spring connecting the vehicle front bumper and the vehicle frame, and a second buffer return spring connecting the vehicle rear bumper and the vehicle frame.

2. The magnetic collision damping device for vehicles of claim 1, characterized by comprising a power switch in conjunction with the first trough, or a power switch in conjunction with the second trough, the power switch being connected in series in current circuits of all electromagnets and turned on only when the movement of the first trough or the second trough occurs.

3. A magnetic collision damping device for vehicles, comprising a vehicle front bumper and a vehicle rear bumper, characterized by comprising:
   a first trough and a second trough that are slidably connected to a vehicle frame and mounted at a position near a rear part of a vehicle body, a third trough arranged between the first trough and the second trough and fixed onto the vehicle frame, the first trough and the third trough being separated at a certain distance, the second trough and the third trough being separated at a certain distance, and a first stopper and a second stopper fixed onto the vehicle frame, the first stopper preventing the first trough from sliding in a direction toward a vehicle front so that the first trough is only able to slide in a direction toward a vehicle rear, the second stopper preventing the second trough from sliding in the direction toward the vehicle rear so that the second trough is only able to slide in the direction toward the vehicle front;
   at least one electromagnet fixed inside each of the first trough, the second trough and the third trough, like poles of the electromagnets inside the first trough and the third trough being arranged to face each other, like poles of the electromagnets inside the second trough and the second trough being arranged to face each other;
   a first mandrel fixed to the vehicle front bumper and configured to be slidably connected to the vehicle frame and extend to the first trough, wherein when the vehicle front bumper is subject to an impact from the front of the vehicle front, the electromagnet inside the first trough is caused to move closer to the electromagnet inside the third trough so as to generate a repulsion force therebetween by virtue of the first mandrel pressing against the first trough to drive the first trough to move toward the third trough;
   a second mandrel fixed to the vehicle rear bumper and configured to be slidably connected to the vehicle frame and extend to the second trough, wherein when the vehicle rear bumper is subject to an impact from the rear of the vehicle rear, the electromagnet inside the second trough is caused to move closer to the electromagnet inside the third trough so as to generate a repulsion force therebetween by virtue of the second mandrel pressing against the second trough to drive the second trough to move toward the third trough;
   a linkage mechanism provided between the first trough and the second trough in a manner that the movement of the first trough toward the second trough triggers the linkage mechanism to drive the second trough to move toward the first trough, and the movement of the second trough toward the first trough triggers the linkage mechanism to drive the first trough to move toward second trough;
   a first buffer return spring connecting the vehicle front bumper and the vehicle frame, and a second buffer return spring connecting the vehicle rear bumper and the vehicle frame.

4. The magnetic collision damping device for vehicles of claim 3, characterized in that the linkage mechanism comprises a link fixedly connected to the first trough and a lever rotatably connected to the vehicle frame, one end of the lever being articulated with the link, and another end of the lever being articulated with the second trough, and in that the movement of the first trough toward the second trough causes the link to rotate the lever which in turn drives the second trough to move toward the first trough.

5. The magnetic collision damping device for vehicles of claim 4, characterized by comprising a power switch in conjunction with the first trough, or a power switch in conjunction with the second trough, the power switch being connected in series in current circuits of all electromagnets and turned on only when the movement of the first trough or the second trough occurs.

6. The magnetic collision damping device for vehicles of claim 3, characterized in that the linkage mechanism comprises a link fixedly connected to the second trough and a lever rotatably connected to the vehicle frame, one end of the lever being articulated with the link, and another end of the lever being articulated with the first trough, and in that the movement of the first trough toward the second trough causes rotation of the lever which in turn drives the link to pull the second trough to move toward the first trough.

7. The magnetic collision damping device for vehicles of claim 6, characterized by comprising a power switch in conjunction with the first trough, or a power switch in conjunction with the second trough, the power switch being connected in series in current circuits of all electromagnets and turned on only when the movement of the first trough or the second trough occurs.

8. The magnetic collision damping device for vehicles of claim 3, characterized in that a third buffer return spring is provided to connect the first trough and the third trough, and a fourth buffer return spring is provided to connect the second trough and the third trough.

9. The magnetic collision damping device for vehicles of claim 8, characterized by comprising a power switch in conjunction with the first trough, or a power switch in conjunction with the second trough, the power switch being connected in series in current circuits of all electromagnets and turned on only when the movement of the first trough or the second trough occurs.

10. The magnetic collision damping device for vehicles of claim 3, characterized by comprising a power switch in conjunction with the first trough, or a power switch in conjunction with the second trough, the power switch being connected in series in current circuits of all electromagnets and turned on only when the movement of the first trough or the second trough occurs.

* * * * *